United States Patent [19]

Thompson et al.

[11] 4,149,750
[45] Apr. 17, 1979

[54] TRANSPARENT AUTOMOBILE TOP

[76] Inventors: James O. Thompson, Florence Arms Apts., Apt. 1, Florence, Ala. 35630; Winston D. Slatton, 203 Ford St., Muscle Shoals, Ala. 35660

[21] Appl. No.: 916,284

[22] Filed: Jun. 16, 1978

Related U.S. Application Data

[63] Continuation of Ser. No. 749,629, Dec. 13, 1976, Pat. No. 4,095,841.

[51] Int. Cl.² .............................................. B60J 7/18
[52] U.S. Cl. ................................................. 296/137 B
[58] Field of Search ....................... 296/137 B, 137 R; 49/465

[56] References Cited

U.S. PATENT DOCUMENTS

| | | | |
|---|---|---|---|
| 3,610,681 | 10/1971 | Trenkler | 296/137 R |
| 3,764,179 | 10/1973 | Burton | 296/137 R |
| 3,913,971 | 10/1975 | Green | 296/137 B |

Primary Examiner—Robert R. Song
Attorney, Agent, or Firm—C. A. Phillips

[57] ABSTRACT

A single piece, transparent, removable top for an automobile, the top replacing a two-piece opaque top separately attachable to two openings in the top of the vehicle separated by a longitudinally extending support bar. The top extends over the bar and is attached to it and at extreme four corners of the combined openings.

3 Claims, 2 Drawing Figures

TRANSPARENT AUTOMOBILE TOP

This is a continuation of application Ser. No. 749,629 filed Dec. 13, 1976, now U.S. Pat. No. 4,095,841.

BACKGROUND OF THE INVENTION

1. Field of the Invention

This invention relates to removable automobile tops, and particularly to a single piece transparent top adapted to replace two side-by-side opaque removable tops.

2. General Description of the Prior Art

One model for the popular Corvette manufactured for several years by General Motors has a generally open roof which may be selectively closed by the user by means of two insertable roof sections, these roof sections being supported in the middle by a bar or support which runs longitudinally between a point just over the vehicle. Where the two side roof sections attach to this bar, two grooves are formed which catch water which sometimes leaks into the passenger compartment. In fact, the grooves tend to act like funnels. Further, the existing roof top sections have an overall thickness of approximately three inches, which subtracts from the already fairly low height of this vehicle which restricts headroom.

It is the object of this invention to provide a new and improved top assembly for a Corvette which overcomes the above and other difficulties.

SUMMARY OF THE INVENTION

In accordance with this invention, a top is constructed to fit a Corvette using a single sheet of transparent plastic, such as that manufactured under the trademark plexiglass. It is contoured in the center to pass just above the longitudinal running supporting bar and is attached at six places, essentially at four corners to side located upright portions of the Corvette, and attached by brackets in the center region of the top, these being attached to the center bar. A gasket or gaskets extend around the inner periphery of the top, and by means of the attachment members, the top is pulled down against the periphery of the top opening of the vehicle and sealed by the resulting conforming depression of the gasket.

DETAILED DESCRIPTION OF THE DRAWINGS

Figure 1:
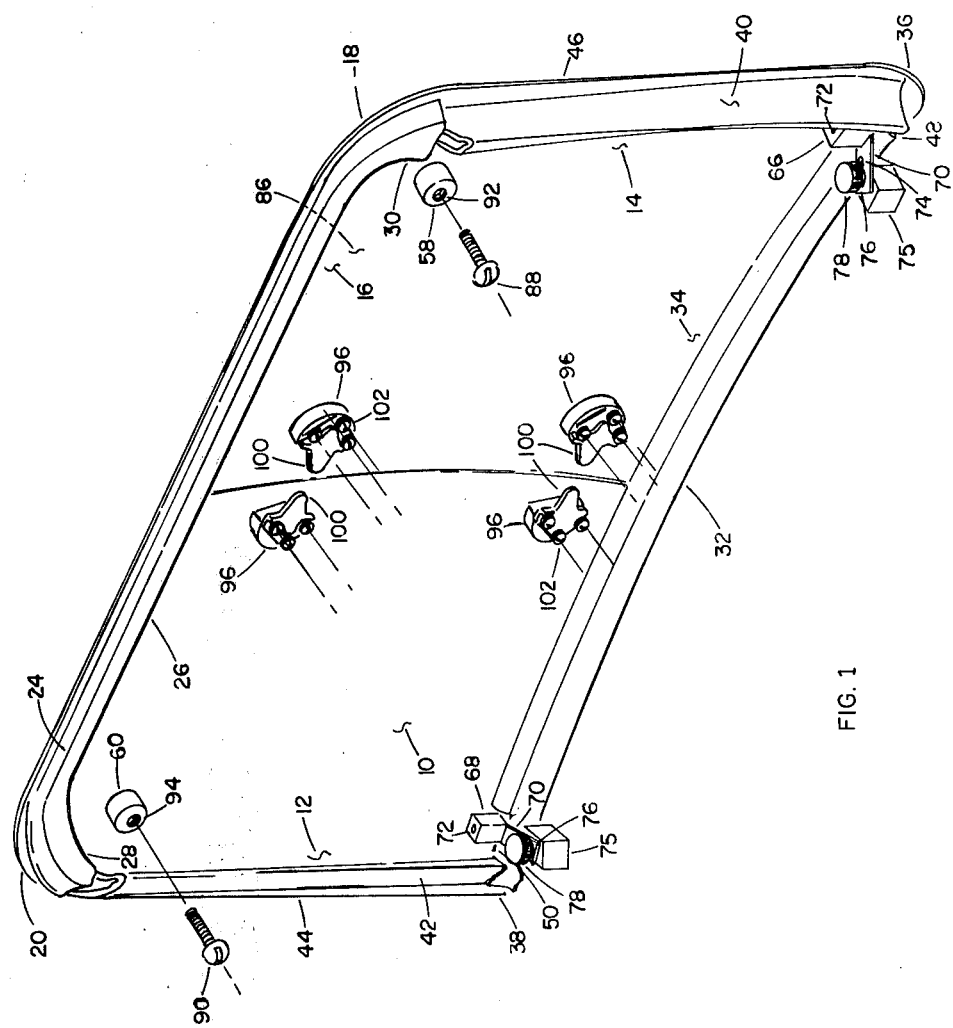
FIG. 1 is a pictorial view of an embodiment of this invention.
Figure 2:
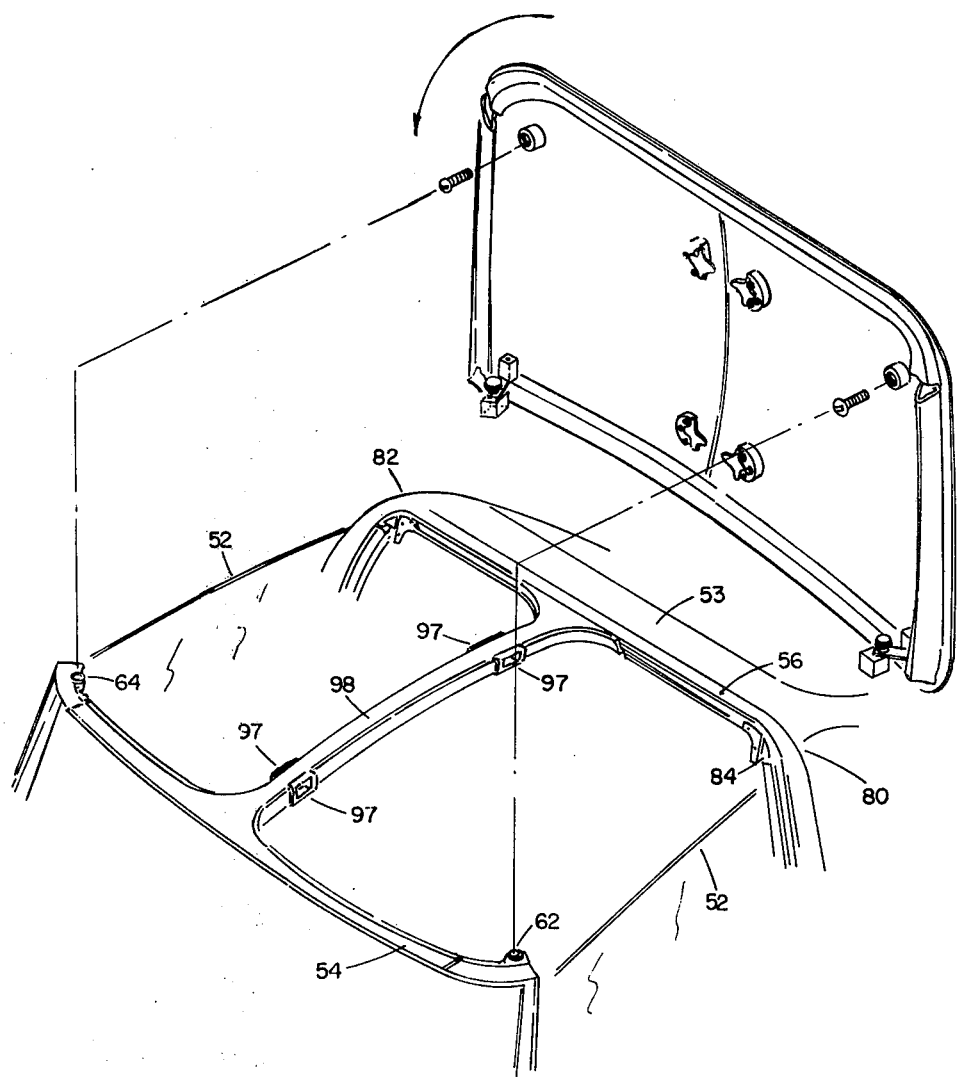
FIG. 2 is a pictorial view illustrating the positioning of an embodiment of this invention on a vehicle.

Referring to FIG. 1, a sheet of transparent rigid plastic material of a thickness of 3/16 to 5/16 inch is cut and formed into curved sheet 10. It is curved downward at each side 12 and 14 and at front edge 16. Where turned down, the side edges are essentially straight, and the rear edge, while rising toward the center, would intersect a vertical plane extending from side to side. The turned down front edge 16 has curved corner regions 18 and 20 and is essentially straight in mid section 22.

Sealing gaskets around all four sides are of a generally triangular cross section, hollow, flexible material having a base of 1½ to 2 inches, a height of ½ to 1 inch, and a wall thickness of 3/32 to 3/16 inch. The hypotenuse side of triangular-shaped gasket 24 is glued to the underside of front edge region 26 of sheet 10, extending to points 28 and 30. The base or shorter width side of the gasket provides a front surface which tapers rearward. Likewise, the hypotenuse side of rear gasket 32 is glued to the underside of rear edge region 34 of sheet 10, extending to each side 36 and 38 of sheet 10. Its base is to the rear and it tapers forward. Side gaskets 40 and 42 are glued on their short side to outer edge portions 44 and 46 of sheet 10 and extend from termination points 28 and 30 of front gasket 24 rearward to a point adjacent to the rear side edges 48 and 50 of rear gasket 32. The side gaskets seal against the top of side glasses 52 of vehicle 53, the forward gasket 24 seals against top rim 54 of the windshield of the vehicle, and rear gasket 32 seals against a rear upper portion 56 of the compartment housing of the vehicle, just above the rear window of the vehicle (not shown).

Two bolt receiving pedestals or blocks 58 and 60 are glued to front corner regions of sheet 10 and are adapted to rest on pedestal supports or brackets 62 and 64 of vehicle 53. A pair of supporting blocks 66 and 68 are glued to rear corner regions of sheet 10. An arm 70 is pivotally supported on each of these blocks, being pivoted about a generally longitudinally supported axle 72. Each of arms 70 has a longitudinal slot 74 in which is supported an attachment block 75 by means of bolt 76 and knob 78, bolt 76 threading into and thus clamping block 75 to arm 70 at a selected position in slot 74. At rear corners 80 and 82 of vehicle 53 there is positioned a ledge 84, over which blocks 75 extend to lock the rear portion of top 86 in position. Front blocks 58 and 60 are locked in position by means of bolts 88 and 90 extending through holes 92 and 94 in brackets 62 and 64 and threaded tight in blocks 58 and 60.

Four centrally positioned attaching blocks 96 are glued to sheet 10 proximate to laterally extending openings 97 in bar or T-bar (as it is called) 98. A bayonet-shaped locking member 100 is insertable in each said opening, locking member 100 being attached by means of bolts 102 in each block. When so inserted and attached, the center region of top 86 is effectively secured. With all eight attachment points secured, a balanced pressure is applied around the top to mating vehicle surfaces, and the leakage problem heretofore experienced is solved. Additionally, since top 86 extends over the top of T-bar 98, typically by ¼ inch, and the thickness of top 86 is only on the order of ¼ inch, there is provided significantly greater headroom within the vehicle than that experienced with previous tops having a thickness on the order of three inches, and having a top surface essentially flush with the top surface of T-bar 98.

Having thus described our invention, what is claimed is:

1. A removable top for an automotive vehicle comprising:
    a centrally positioned, longitudinally extending, support bar attached to said vehicle, said support bar including a plurality of laterally extending recesses;
    a generally rectangular sheet of transparent material being of a thickness of 3/16 to 5/16 inch;
    said sheet extending over said support bar and extending concavely downward to the sides and front of said sheet;
    a plurality of attachment means attached to a central region of said sheet of transparent material, and each said attachment member including means for laterally extending into said recesses in said longitudinally extending support bar, whereby said top is attached to said support bar; and attachment means secured to each corner region of said sheet for attaching said top to said vehicle.

2. An automobile top as set forth in claim 1 wherein said top includes sealing means, in turn comprising triangular-shaped, base small with respect to height, hollow gaskets, said gaskets being attached by a side to said sheet and positioned in a low profile position extending along the underside of said sheet at the front and rear edges of said sheet, and attached by a side to said sheet and positioned in a high profile position extending downward on each side edge region of said sheet.

3. An automobile top as set forth in claim 2 wherein the hypotenuse side of a section of said triangular-shaped gasket is glued to the front edge region of said sheet, with base forward, to form a front gasket, the hypotenuse side of a section of said triangular-shaped gasket is glued to the rear edge region of said sheet, with base at rear, to form a rear edge gasket, and the base of said triangular-shaped gasket is glued to the underside of each side edge region of said sheet, said hypotenuse side being an inner side of the side gaskets.

* * * * *